United States Patent [19]

Brown

[11] 4,280,080
[45] Jul. 21, 1981

[54] DEFLECTION-COIL SYSTEM FOR COLOR PICTURE TUBES

[75] Inventor: Patrick Brown, Straubing, Fed. Rep. of Germany

[73] Assignee: International Standard Electric Corporation, New York, N.Y.

[21] Appl. No.: 74,644

[22] Filed: Sep. 12, 1979

[30] Foreign Application Priority Data

Sep. 14, 1978 [DE] Fed. Rep. of Germany ....... 2839935

[51] Int. Cl.³ .................... H01J 29/70; H01J 29/76
[52] U.S. Cl. .................... 315/368; 315/13 C; 335/213
[58] Field of Search ............ 315/13 C, 368, 399; 335/213

[56] References Cited

U.S. PATENT DOCUMENTS

| 3,851,215 | 11/1974 | Dekeijser et al. | 335/213 |
| 4,027,219 | 5/1977 | Van Alphen et al. | 315/13 C |

Primary Examiner—Theodore M. Blum
Attorney, Agent, or Firm—John T. O'Halloran; Alfred C. Hill

[57] ABSTRACT

The 45°/45° four-pole field required to correct dynamic covergence errors in a color-picture tube have in the past been produced by four auxiliary coils wound around the core of the vertical deflection toroidal-coil. According to the present invention, each of the toroidal-coil halves of the vertical deflection toroidal-coil is subdivided into three coils with alternate ones of the resulting six coils being connected in series. This provides the desired 45°/45° four-pole field and the vertical deflection field with a saving of winding wire and winding time.

9 Claims, 8 Drawing Figures

DEFLECTION-COIL SYSTEM FOR COLOR PICTURE TUBES

BACKGROUND OF THE INVENTION

The present invention relates to a deflection-coil system for multibeam color-picture tubes wherein, for dynamic convergence correction, a 45°/45° four-pole field is superimposed on the deflection fields with component windings of the deflection coils.

This 45°/45° four-pole field is needed to achieve convergence over the entire screen, as is described in detail in the Journal "Funkschau", 1976, No. 1, Rö 64, pages 21-22. It is commonly produced by four additional toroidal windings wound around the deflection-coil core, as is described, for example, in German Pat. No. 2,031,837 for both delta-gun and inline arrangements.

45°/45° four-pole fields provided by these additional toroidal windings fulfil the requirements imposed on them in terms of convergence correction quite satisfactorily.

However, the four additional windings occupy much winding space. This limits the number of turns of a vertical deflection coil in the form of a toroid and, thus, reduces the attainable vertical deflection sensitivity. If horizontal deflection is produced by a saddle coil, and vertical deflection by a toroidal coil, two of the four additional windings must be located at points where the coil core is divided prior to assembly, which entails winding problems.

Integration of the four auxiliary windings into the actual deflection windings is described in German Pat. No. 2,341,646. There, however, both the horizontal and the vertical deflection coil are toroids, so that it is possible to produce the 45°/45° four-pole field by means of the four toroidal-coil halves if the latter are suitably wired.

SUMMARY OF THE INVENTION

An object of the present invention is to provide a winding arrangement for the vertical deflection coil for producing the 45°/45° four-pole field and the vertical deflection field if only the vertical coil is made in the form of a toroid, while the horizontal coil has a different form, such as that of a saddle coil, i.e. if only two toroidal-coil halves are available.

A feature of the present invention is the provision of a deflection-coil system for a multibeam color-picture tube to provide a vertical deflection field and a 45°/45° four-pole field for dynamic convergence correction superimposed on the deflection field comprising: a vertical deflection toroidal coil having two halves each of which are separated into three component windings; first means to connect alternate ones of the six component windings into two groups of three series connected component windings each; and second means connected to the two groups of component windings to produce a current traversing each of the two groups of component windings to provide the vertical deflection field and the 45°/45° four-pole field simultaneously.

The advantages offered by such a solution have already been indicated in the foregoing and include the production of the 45°/45° four-pole field by the split-up vertical deflection coil alone, which involves a reduction of the total number of turns required, thus, permitting better use of the available winding space and a cut in winding time.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

FIG. 1 shows how a 45°/45° four-pole field is produced by means of four additional toroidal coils 2 wound on a core 1. The correcting current $I_k(t)$ is essentially a vertical-frequency current since the assembly errors of present-day deflection systems require this, as is described, for example, in "Funkschau", 1976, No. 1, Rö 64, page 22. To correct errors due to assembly inaccuracies, an addition of horizontal-frequency currents may be necessary in individual cases.

Figures 1A, 1B, 1C:
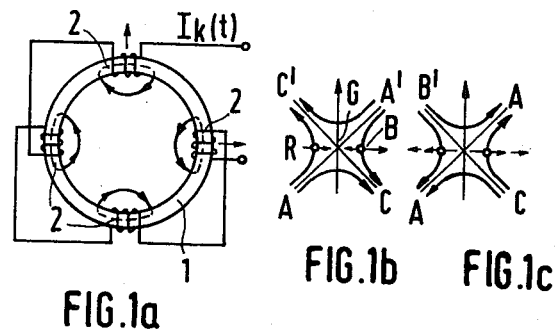
FIGS. 1a to 1c show the production of a 45°/45° four-pole field and its action.
Figure 2:
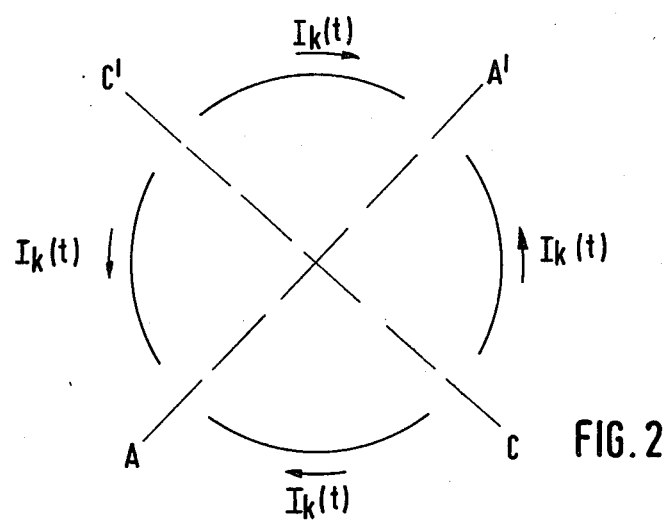
FIG. 2 shows schematically the currents in the auxiliary coils.

Possible field shapes and their effects on the beams R, G, B are apparent from FIGS. 1b and 1c. The axes A—A' and C—C' are axes of symmetry of the 45°/45° four-pole field. As can be seen from FIG. 1a, if the auxiliary toroidal coils are wound in the same sense, the currents in successive coils must be oppositely directed to be able to produce a 45°/45° field. This is shown schematically in FIG. 2. The current strength in each of the quadrants formed by the axes A—A' and C—C' is $I_k(t)$.

Figure 3:
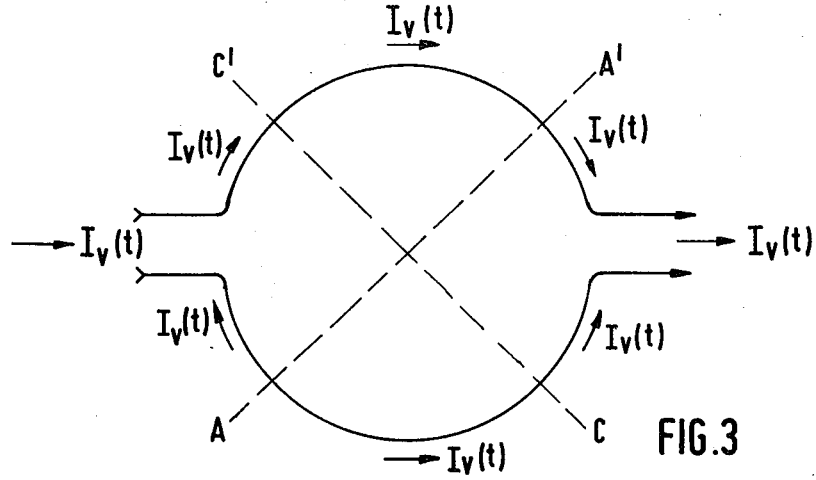
FIG. 3 shows schematically the currents in the deflection coils.

In FIG. 3, the direction of the vertical deflecting current $I_v(t)$ is indicated for the same sense of winding of the two coil halves. The dashed axes of symmetry A—A' and C—C' intersect each of the two halves of the vertical deflection coil. If the coils are divided at these points of intersection, and the parts of the coils are suitably wired, it must therefore be possible to create, in addition to the vertical deflection field, a 45°/45° auxiliary-pole field with the axes of symmetry A—A' and C—C'.

Figure 4:
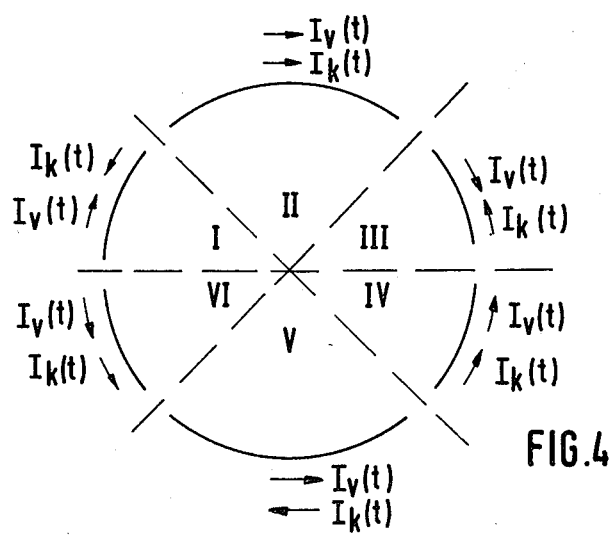
FIG. 4 shows schematically the currents in the component windings of a deflection system according to the principles of the present invention.

FIG. 4 shows how the two halves of the toroidal vertical deflection coil are subdivided into three parts in accordance with the present invention. By comparing the current directions for producing the 45°/45° auxiliary-pole field of FIG. 2 and the current directions for producing the vertical deflection field of FIG. 3, the currents in the component windings I to VI are as follows:

$$I_I = I_{III} = I_V = I_v(t) - I_k(t) \tag{1}$$

$$I_{II} = I_{IV} = I_{VI} = I_v(t) + I_k(t) \tag{2}$$

By a suitable wiring which ensures that the component windings I, III, and V are traversed by the current $I_v(t) - I_k(t)$, and the component windings II, IV and VI by the current $I_v(t)+I_k(t)$, a 45°/45° four-pole field can thus be produced without any additional windings.

Figure 5:
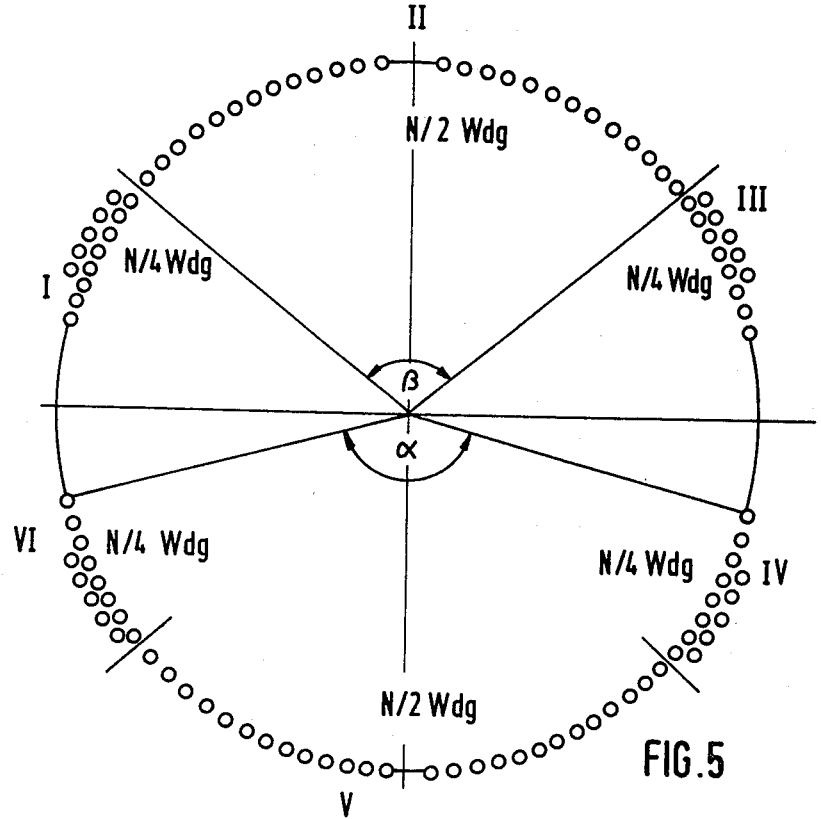
FIG. 5 shows an embodiment of the deflection system according to the principles of the present invention.

An embodiment of the deflection system according to the present invention is shown in FIG. 5. Each coil half contains N windings. Each of the component windings II and V has N/2 windings, and each of the component windings I, III, IV and VI has N/4 windings. Ech of the two toroidal-coil halves covers an angle $\alpha$ of about 150°, the two central component windings II and V each extending over an angle $\beta$ of about 100°.

Advantageously, during the winding operation, one or more additional windings are wound at the points of interruption, and after being separated at these points, they are uncoiled and brought out.

Figure 6:
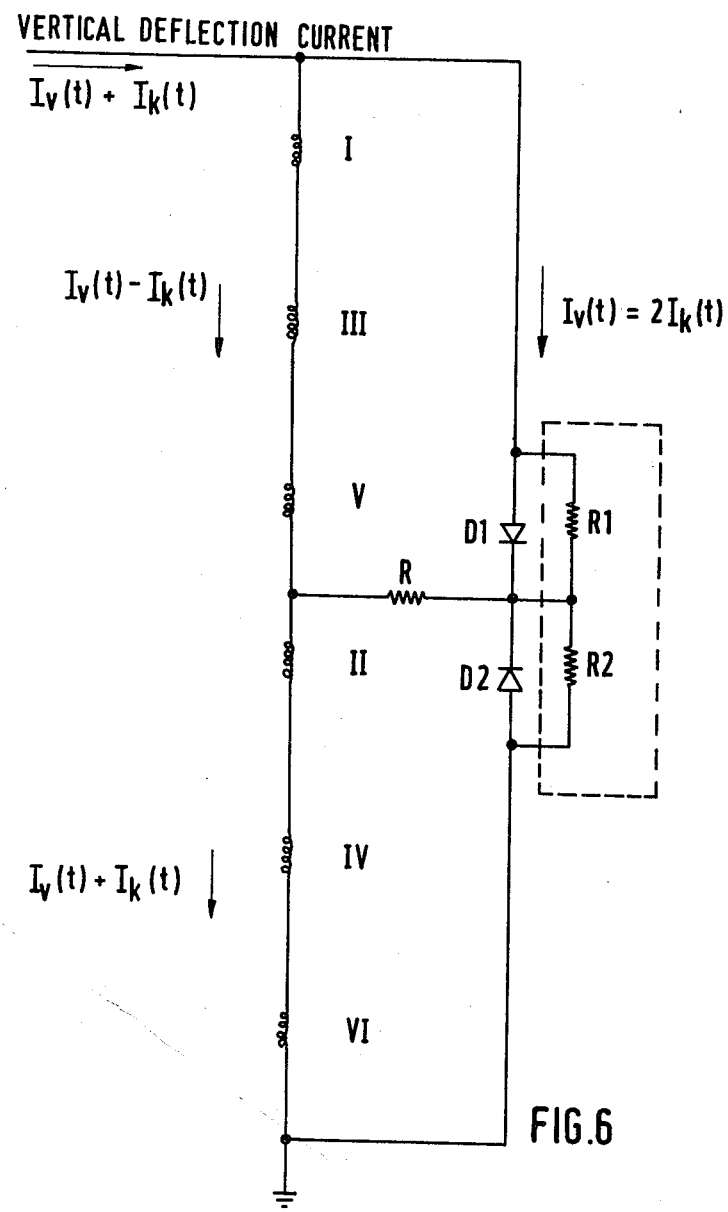
FIG. 6 shows a circuit for a deflection system according to the principles of the present invention.

A particularly simple circuit for generating the currents $I_v(t)+I_k(t)$ and $I_v(t)-I_k(t)$ is shown in FIG. 6. The six component windings are connected together in the order I, III, V, II, IV, VI and fed with a vertical deflection current $I_v(t)+I_k(t)$. Connected in parallel with the component windings are back-to-back diodes D1 and D2, whose junction is connected to the junction of the component windings V and II through a resistor R. If the vertical deflection output stage provides a positive voltage, the component windings I, III, and V are traversed by the current $I_v(t)+I_k(t)-I_u(t)$, where $I_u(t)$ is the bypass current in the bypass line via D1 and R. If R is chosen so that $I_u(t)=2 I_k(t)$, the component windings I, II and V are traversed by the current $I_v(t)-I_k(t)$, and the component windings II, IV and VI by the current $I_v(t)+I_k(t)$, as is required in equations (1) and (2) for the production of a 45°/45° four-pole field.

When the polarity of the vertical deflecting voltage is reversed, the bypass line via D2 and R becomes effective. Now, the component windings I, III and V are traversed by the current $I_v(t)+I_k(t)$, and the component windings II, IV, and VI by the current, $I_v(t)-I_k(t)$. In this manner, the direction of the 45°/45° auxiliary-pole field is maintained, as is necessary to correct the assembly errors of present-day self-converging deflection systems.

The two resistors R1 and R2, connected in parallel with the diodes D1 and D2, prevent any abrupt changes in correcting current in the region of the diode knee.

While I have described above the principles of my invention in connection with specific apparatus it is to be clearly understood that this description is made only by way of example and not as a limitation to the scope of my invention as set forth in the object thereof and in the accompanying claims.

I claim:

1. A deflection-coil system for a multibeam color-picture tube to provide a vertical deflection field and a 45°/45° four-pole field for dynamic convergence correction superimposed on said deflection field comprising:
   a vertical deflection toroidal coil having two halves each of which are separated into three component windings;
   first means to connect alternate ones of said six component windings into two groups of three series connected component windings each; and
   second means connected to said two groups of component windings to produce a current traversing each of said two groups of component windings to provide said vertical deflection field and said 45°/45° four-pole field simultaneously.

2. A system according to claim 1, wherein said current includes
   a vertical deflection current and a dynamic convergence correction current.

3. A system according to claim 2, wherein
   said current traversing one of said two groups of component windings is equal to said deflection current plus said correction current, and
   said current traversing the other of said two groups of component windings is equal to said deflection current minus said correction current.

4. A system according to claim 3, wherein said second means includes
   an input for said deflection current and said correction current coupled to said two groups of component windings, said two groups of component windings being connected in series with each other between said input and ground potential,
   a pair of back-to-back diodes connected in parallel to said series connected two groups of component windings, and
   a resistor connected between the junction of said pair of diodes and the junction of said series connected two groups of component windings.

5. A system according to claim 4, wherein said second means further includes
   a pair of resistors each being connected in parallel to a different one of said pair of diodes.

6. A system according to claim 1, wherein said second means includes
   an input for a vertical deflection current coupled to said two groups of component windings, said two groups of component windings being connected in series with each other between said input and ground potential,
   a pair of back-to-back diodes connected in parallel to said series connected two groups of component windings, and
   a resistor connected between the junction of said pair of diodes and the junction of said series connected two groups of component windings.

7. A system according to claim 6, wherein said second means further includes
   a pair of resistors each being connected in parallel to a different one of said pair of diodes.

8. A system according to claim 7, wherein said vertical deflection current includes
   a deflection current and a dynamic convergence connection current.

9. A system according to claim 6, wherein said vertical deflection current includes
   a deflection current and a dynamic convergence correction current.

* * * * *